US011581915B2

(12) United States Patent
Luo et al.

(10) Patent No.: US 11,581,915 B2
(45) Date of Patent: Feb. 14, 2023

(54) DEVICE CONTROL METHOD AND APPARATUS, STORAGE MEDIUM, PROCESSOR, AND TERMINAL

(71) Applicant: CONSUMER LIGHTING (U.S.), LLC, Norwalk, CT (US)

(72) Inventors: Xin Luo, Shanghai (CN); Zhiyong Wang, Shanghai (CN); Can Feng, Shanghai (CN); Yiming Wang, Shanghai (CN)

(73) Assignee: SAVANT TECHNOLOGIES LLC, Norwalk, CT (US)

( * ) Notice: Subject to any disclaimer, the term of this patent is extended or adjusted under 35 U.S.C. 154(b) by 69 days.

(21) Appl. No.: 16/936,380

(22) Filed: Jul. 22, 2020

(65) Prior Publication Data

US 2021/0044315 A1 Feb. 11, 2021

(30) Foreign Application Priority Data

Aug. 5, 2019 (CN) .......................... 201910718288.9

(51) Int. Cl.
*H04W 88/06* (2009.01)
*H04W 76/23* (2018.01)
*H04B 1/401* (2015.01)
*H04W 52/02* (2009.01)
*H04W 4/80* (2018.01)

(52) U.S. Cl.
CPC .............. *H04B 1/401* (2013.01); *H04W 4/80* (2018.02); *H04W 52/0229* (2013.01); *H04W 76/23* (2018.02); *H04W 88/06* (2013.01)

(58) Field of Classification Search
CPC ... H04W 4/80; H04W 52/0229; H04W 76/23; H04W 88/06; H04B 1/401
See application file for complete search history.

(56) References Cited

U.S. PATENT DOCUMENTS

| | | | |
|---|---|---|---|
| 2016/0254851 A1* | 9/2016 | Yan | H04B 7/0814 455/552.1 |
| 2018/0373304 A1* | 12/2018 | Davis | G05B 15/02 |
| 2019/0320358 A1* | 10/2019 | Knapp | H04W 52/0241 |
| 2019/0349217 A1* | 11/2019 | Saes | H05B 47/18 |
| 2020/0351696 A1* | 11/2020 | Hong | H04W 24/10 |
| 2021/0051459 A1* | 2/2021 | Liu | H04L 67/12 |

* cited by examiner

*Primary Examiner* — Brian P Cox
(74) *Attorney, Agent, or Firm* — Wood IP LLC

(57) ABSTRACT

The application relates to a device control method and apparatus, a storage medium, a processor, and a terminal. A device has a WIFI module for WIFI connection and a Bluetooth module for Bluetooth connection. The device control method includes: acquiring a network module status of the device, wherein the network module status indicates whether the WIFI module or Bluetooth module of the device is enabled; if the WIFI module and the Bluetooth module are enabled, detecting wireless data packet features in a wireless network environment where the device is located; and controlling the device according to the detected wireless data packet features so that one of the WIFI module and the Bluetooth module is enabled and the other one of the WIFI module and the Bluetooth module is disabled. The technical solution of the application causes a WIFI and Bluetooth dual-mode device to intelligently select an operating mode, and avoids interference caused by the coexistence of radio frequency signals.

20 Claims, 3 Drawing Sheets

DEVICE CONTROL METHOD AND APPARATUS, STORAGE MEDIUM, PROCESSOR, AND TERMINAL

TECHNICAL FIELD

The application relates to the field of communication. Specifically, the application relates to a device control method and apparatus, a storage medium, a processor, and a terminal.

BACKGROUND

A Bluetooth Low Energy Mesh Network (BLE Mesh) may be well used for local device control, for example, the interaction between local devices in a local area network. At the same time, WiFi networks may provide devices with the ability to access the Internet. A network chip of a WiFi and Bluetooth dual-mode network device can provide both WiFi and Bluetooth network functions.

In the use of the WiFi and Bluetooth dual-mode network device, it is generally expected that the device is a WiFi device in some cases and the device is a Bluetooth device in other cases.

In actual use, the WiFi and Bluetooth dual-mode network device cannot automatically select whether it is a WiFi device or a Bluetooth device. If the device is a WiFi device, there is no need to turn on a Bluetooth function at the same time, and if the device is a Bluetooth device, there is no need to turn on a WiFi function at the same time. If the WiFi and Bluetooth dual-mode network device cannot intelligently select a specific operating mode, the WiFi and Bluetooth functions may be turned on at the same time, which may cause the problem of coexistence of radio frequency signals and cause signal interference.

SUMMARY

The embodiments of the application provide a device control method and apparatus, a storage medium, a processor, and a terminal, which are intended to at least solve the problem in the conventional art that a working mode of a WiFi and Bluetooth dual-mode network device cannot be automatically selected.

According to an embodiment of the application, a device control method is provided. A device has a WIFI module for WIFI connection and a Bluetooth module for Bluetooth connection. The method includes that: a network module status of the device is acquired, wherein the network module status indicates whether the WIFI module or Bluetooth module of the device is enabled; if the WIFI module and the Bluetooth module are enabled, wireless data packet features in a wireless network environment where the device is located are detected; and the device is controlled according to the detected wireless data packet features so that one of the WIFI module and the Bluetooth module is enabled and the other one of the WIFI module and the Bluetooth module is disabled.

In this way, the type of a working mode of the device is automatically selected according to the wireless network environment in which the device is located.

According to an exemplary embodiment of the application, if the wireless data packet features indicate WIFI features, the WIFI module is enabled and the Bluetooth module is disabled; or if the wireless data packet features indicate Bluetooth features, the Bluetooth module is enabled and the WIFI module is disabled.

In this way, the device is automatically caused to enable a WiFi function and turn off a Bluetooth function, or enable the Bluetooth function and turn off the WiFi function.

According to an exemplary embodiment of the application, the operation that wireless data packet features in a wireless network environment where the device is located are detected includes that: a wireless data packet in a wireless network environment where the device is located is acquired; the wireless data packet is parsed to acquire WIFI features and Bluetooth features of the wireless data packet; and the more obvious one of the WIFI features and the Bluetooth features are used as features indicated by the wireless data packet features.

In this way, it is possible to automatically determine the type of a wireless network environment where the device is located.

According to an exemplary embodiment of the application, the WIFI module or the Bluetooth module of the device is set to an enabled state when the device is delivered or when the device is powered on.

According to another aspect of the embodiments of the application, a device control apparatus is further provided. A device has a WIFI module for WIFI connection and a Bluetooth module for Bluetooth connection. The apparatus includes: a status determination module, configured to acquire a network module status of the device, wherein the network module status indicates whether the WIFI module or the Bluetooth module of the device is enabled; a feature detection module, configured to detect, if the WIFI module and the Bluetooth module are enabled, wireless data packet features in a wireless network environment where the device is located; and a mode selection module, configured to control the device according to the detected wireless data packet features so that one of the WIFI module and the Bluetooth module is enabled and the other one of the WIFI module and the Bluetooth module is disabled.

In this way, the type of a working mode of the device is automatically selected according to the wireless network environment in which the device is located.

According to an exemplary embodiment of the application, if the wireless data packet features indicate WIFI features, the mode selection module enables the WIFI module and disables the Bluetooth module; or if the wireless data packet features indicate Bluetooth features, the mode selection module enables the Bluetooth module and disables the WIFI module.

In this way, the device is automatically caused to enable a WiFi function and turn off a Bluetooth function, or enable the Bluetooth function and turn off the WiFi function.

According to an exemplary embodiment of the application, the operation that wireless data packet features in a wireless network environment where the device is located are detected includes that: the feature detection module acquires a wireless data packet in a wireless network environment where the device is located, parses the wireless data packet to acquire WIFI features and Bluetooth features of the wireless data packet, and uses the more obvious one of the WIFI features and the Bluetooth features as features indicated by the wireless data packet features.

In this way, it is possible to automatically determine the type of a wireless network environment where the device is located.

According to an exemplary embodiment of the application, the WIFI module or the Bluetooth module of the device is set to an enabled state when the device is delivered or when the device is powered on.

According to another aspect of the embodiments of the application, a storage medium is further provided, which includes a stored program. When the program is run, a device where the storage medium is located is controlled to perform any of the aforementioned methods.

According to another aspect of the embodiments of the application, a processor is further provided. The processor is configured to run a program. When run, the program performs any of the aforementioned methods.

According to another aspect of the embodiments of the application, a terminal is further provided. The terminal includes one or more processors, a memory, and one or more programs. The one or more programs are stored in the memory, and configured to be executed by the one or more processors. When executed, the one or more programs cause the one or more processors to perform any of the aforementioned methods.

According to another aspect of the embodiments of the application, a computer program product is further provided. The computer program product is tangibly stored on a computer-readable medium and includes computer-executable instructions that, when executed, cause at least one processor to perform any of the aforementioned methods.

In this way, the type of a working mode of the device is automatically selected according to the wireless network environment in which the device is located.

In the embodiments of the application, a technical solution is provided to detect a wireless network environment where a WiFi and Bluetooth dual-mode device is located to determine whether a WiFi function or a Bluetooth function should be enabled and another function of the device is disabled, thereby at least solving the technical problem that a working mode of the WiFi and Bluetooth dual-mode network device cannot be automatically determined, and achieving the technical effects of saving time and manpower for setting the dual-mode network device and avoiding signal interference.

BRIEF DESCRIPTION OF THE DRAWINGS

The accompanying drawings described herein are used to provide a further understanding of the application, and constitute a part of the application, and the exemplary embodiments of the application and the description thereof are used to explain the application, but do not constitute improper limitations to the application. In the drawings.

DETAILED DESCRIPTION OF THE EMBODIMENTS

Figure 1:
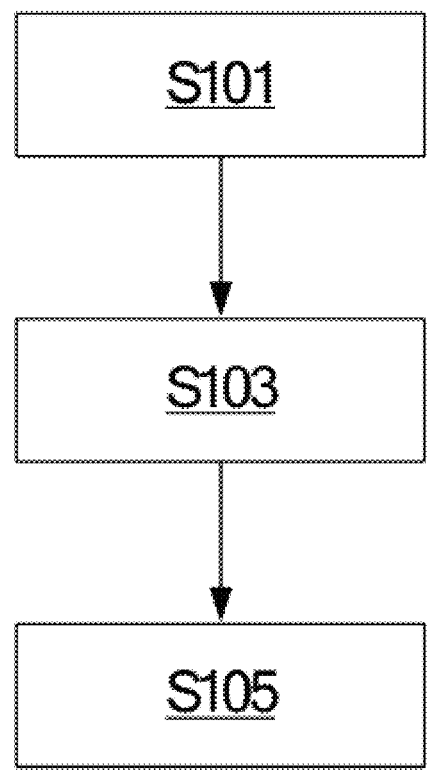
FIG. 1 is a flowchart of a device control method according to an embodiment of the application.

In order to make those skilled in the art better understand the solutions of the application, the technical solutions in the embodiments of the application will be clearly and completely described below with reference to the drawings in the embodiments of the application. It is apparent that the described embodiments are only a part of the embodiments of the application, not all of the embodiments. All other embodiments obtained by those of ordinary skill in the art based on the embodiments of the application without creative efforts should fall within the scope of protection of the application.

It is to be noted that the specification and claims of the application and the terms "first", "second" and the like in the drawings are used to distinguish similar objects, and do not need to describe a specific sequence or a precedence order. It will be appreciated that data used in such a way may be exchanged under appropriate conditions, in order that the embodiments of the application described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or modules or units to clearly list those steps or modules or units, and other steps or modules or units which are not clearly listed or are inherent to these processes, methods, products or devices may be included instead.

Figure 2:
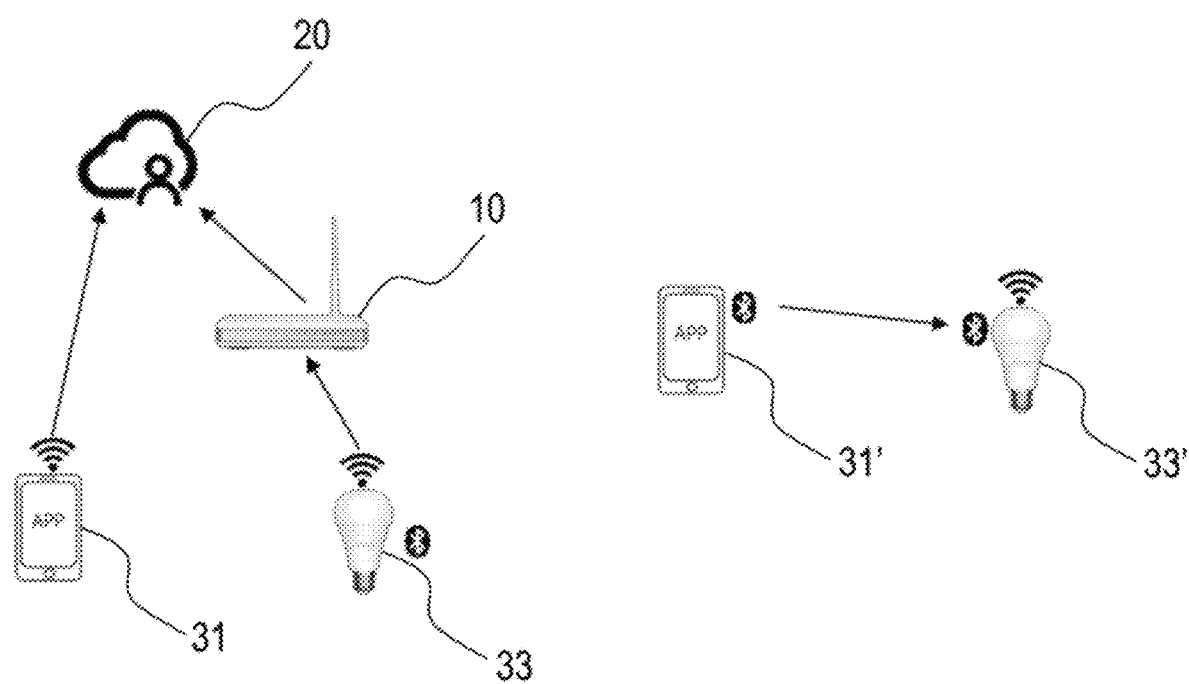
FIG. 2 is a schematic diagram of a dual-mode network device enabling two working modes at the same time.

A WiFi and Bluetooth dual-mode network device cannot automatically select whether it is a WiFi device or a Bluetooth device. FIG. 2 is a schematic diagram of a dual-mode network device enabling two working modes at the same time. As shown in FIG. 2, a device 31 accesses the Internet 20 through a wireless network, a device 33 is connected to a router 10 through a WiFi network and accesses a wireless network 20, the device 33 is a dual-mode network device, and both a WiFi network function and a Bluetooth function are turned on. A device 31' and a device 33' are connected via Bluetooth, the device 33' is a dual-mode network device, and both the Bluetooth function and the WiFi network function are turned on.

According to an embodiment of the application, a device control method is provided. FIG. 1 is a flowchart of a device control method according to an embodiment of the application. A device is a WiFi and Bluetooth dual-mode network device, and has a WIFI module for WIFI connection and a Bluetooth module for Bluetooth connection. As shown in FIG. 1, the device control method includes step S101 in which a network module status of the device is acquired. The network module status indicates whether the WIFI module or the Bluetooth module of the device is enabled. If the WIFI module and the Bluetooth module are enabled, step S103 is performed to detect wireless data packet features in a wireless network environment where the device is located. Then step S105 is performed to control the device according to the detected wireless data packet features so that one of the WIFI module and the Bluetooth module is enabled and the other one of the WIFI module and the Bluetooth module is disabled.

Figure 3:
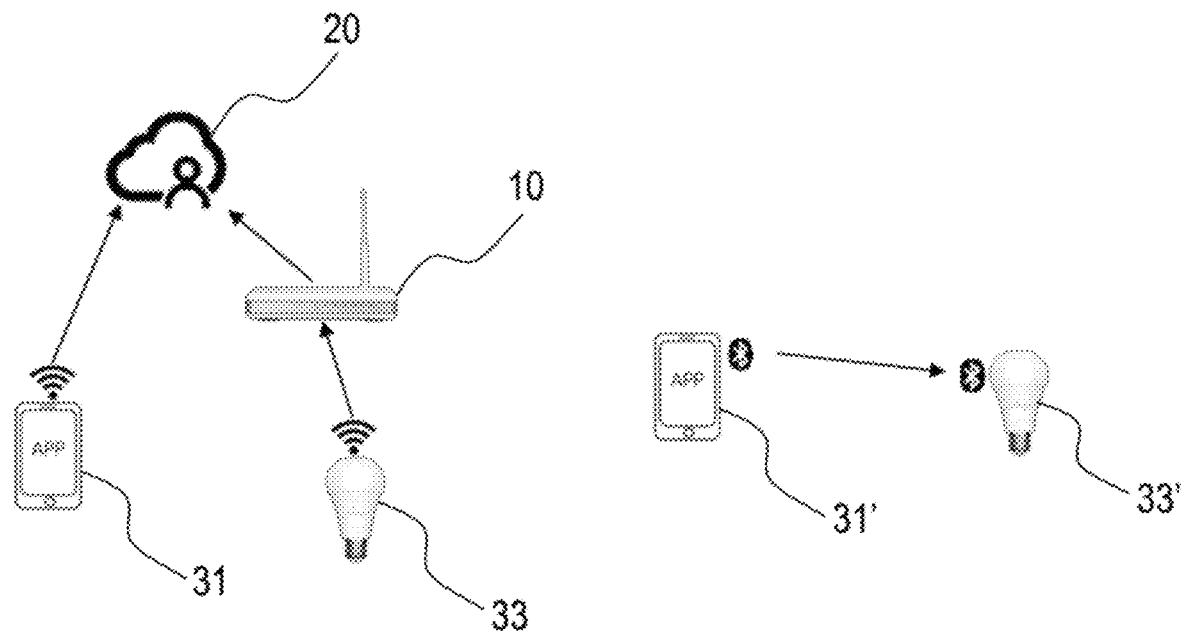
FIG. 3 is a schematic diagram of working of a dual-mode network device according to an embodiment of the application.

The device control method according to an embodiment of the application will be described below with reference to the drawings. FIG. 3 is a schematic diagram of working of a dual-mode network device according to an embodiment of the application. After the device control method according to an embodiment of the application is applied, a WiFi and Bluetooth dual-mode network device may be operated in a required working mode, and unnecessary network functions are turned off. As shown in FIG. 3, a device 31 accesses the Internet 20 through a wireless network, a device 33 is connected to a router 10 through a WiFi network and accesses a wireless network 20, the device 33 is a dual-mode network device, a WiFi network function is turned on, and since the device 33 works as a Wifi device at this moment, a Bluetooth function is turned off. A device 31' and a device 33' are connected via Bluetooth, the device 33' is a dual-mode network device, the Bluetooth function is turned on, and since the device 33' works as a Bluetooth device, the WiFi network function is turned off. In this way, the type of a working mode of the device is automatically selected according to the wireless network environment in which the device is located.

According to an exemplary embodiment of the application, if the wireless data packet features indicate WIFI features, for example, it is detected that the wireless data packet contains specific features of a WIFI data packet or a specific packet in the WIFI data packet is detected, the WIFI module is enabled and the Bluetooth module is disabled; or if the wireless data packet features indicate Bluetooth features, for example, it is detected that the wireless data packet contains specific features of a Bluetooth data packet or a specific packet in the Bluetooth data packet is detected, the Bluetooth module is enabled and the WIFI module is disabled. In this way, the device is automatically caused to enable a WiFi function and turn off a Bluetooth function, or enable the Bluetooth function and turn off the WiFi function.

Specifically, as shown in FIG. 3, the device 33 is a dual-mode network device, the device 33 is in a dual-mode working status when being delivered or turned on, that is, the WiFi function and the Bluetooth function are turned on at the same time. The device control method according to the application detects that the device 33 has both the WiFi function and the Bluetooth function turned on, and detects whether the device 33 is in a WiFi network environment or a Bluetooth network environment. The way to detect whether the device 33 is in the WiFi network environment or the Bluetooth network environment is to detect the wireless data packet features in the network environment. For example, if the device 33 is mainly within a signal range of a WiFi router and it is detected that the wireless data packet features in the wireless network environment indicate WiFi features, the WiFi module of the device 33 is enabled to perform Wifi communication with the router 10, and the unnecessary Bluetooth function is disabled. The device 31' and the device 33' want to establish a Bluetooth connection. At this time, the wireless packet features in the network environment of device 33' indicate Bluetooth features, and the Bluetooth module of the device 33' is enabled to perform Bluetooth communication with the device 31', and the unnecessary Wifi function is disabled.

According to an exemplary embodiment of the application, the operation that wireless data packet features in a wireless network environment where the device is located are detected includes that: a wireless data packet in a wireless network environment where the device is located is acquired; the wireless data packet is parsed to acquire WIFI features and Bluetooth features of the wireless data packet; and the more obvious one of the WIFI features and the Bluetooth features are used as features indicated by the wireless data packet features. In this way, it is possible to automatically determine the type of a wireless network environment where the device is located. It should be understood that, in the device control method according to an embodiment of the application, various technical solutions suitable for determining data packet features in a network environment where a dual-mode network device is located may be used.

According to an exemplary embodiment of the application, the WIFI module or the Bluetooth module of the device is set to an enabled state when the device is delivered or when the device is powered on.

According to another aspect of the embodiments of the application, a device control apparatus is further provided.

Figure 4:
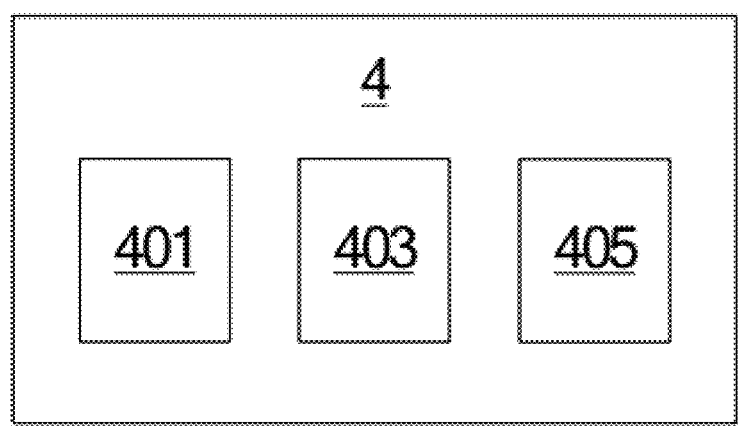
FIG. 4 is a schematic diagram of a device control apparatus according to an embodiment of the application.

FIG. 4 is a schematic diagram of a device control apparatus according to an embodiment of the application. A device has a WIFI module for WIFI connection and a Bluetooth module for Bluetooth connection. As shown in FIG. 4, a device control apparatus 4 according to an embodiment of the application includes: a status determination module 401, a feature detection module 403 and a mode selection module 405. The status determination module 401 is configured to acquire a network module status of the device, wherein the network module status indicates whether the WIFI module or the Bluetooth module of the device is enabled. The feature detection module 403 is configured to detect, if the WIFI module and the Bluetooth module are enabled, wireless data packet features in a wireless network environment where the device is located. The mode selection module 405 is configured to control the device according to the detected wireless data packet features so that one of the WIFI module and the Bluetooth module is enabled and the other one of the WIFI module and the Bluetooth module is disabled. In this way, the type of a working mode of the device is automatically selected according to the wireless network environment in which the device is located.

According to an exemplary embodiment of the application, if the wireless data packet features indicate WIFI features, the mode selection module 405 enables the WIFI module and disables the Bluetooth module; or if the wireless data packet features indicate Bluetooth features, the mode selection module 405 enables the Bluetooth module and disables the WIFI module. In this way, the device is automatically caused to enable a WiFi function and turn off a Bluetooth function, or enable the Bluetooth function and turn off the WiFi function.

According to an exemplary embodiment of the application, the operation that wireless data packet features in a wireless network environment where the device is located are detected includes that: the feature detection module 403 acquires a wireless data packet in a wireless network environment where the device is located, parses the wireless data packet to acquire WIFI features and Bluetooth features of the wireless data packet, and uses the more obvious one of the WIFI features and the Bluetooth features as features indicated by the wireless data packet features. In this way, it is possible to automatically determine the type of a wireless network environment where the device is located.

According to an exemplary embodiment of the application, the WIFI module or the Bluetooth module of the device is set to an enabled state when the device is delivered or when the device is powered on.

The device control method according to an embodiment of the application is performed by the device control apparatus according to an embodiment of the application, and the descriptions are omitted herein.

According to an embodiment of the application, the device control method and apparatus can also be implemented in the following manners.

A storage medium includes a stored program. When the program is run, a device where the storage medium is located is controlled to perform the above method.

A processor is configured to run a program. When run, the program performs the above method.

A terminal includes one or more processors, a memory, and one or more programs. The one or more programs are stored in the memory, and configured to be executed by the one or more processors. When executed, the one or more programs cause the one or more processors to perform the above method.

A computer program product is tangibly stored on a computer-readable medium and includes computer-executable instructions that, when executed, cause at least one processor to perform the above method.

The technical solution of the application may be implemented in any one of the above modes, thereby causing WIFI and Bluetooth dual-mode devices to intelligently select an operating mode, and avoiding interference caused by the coexistence of radio frequency signals.

In the above embodiments of the application, descriptions of each embodiment are emphasized respectively, and parts which are not elaborated in detail in a certain embodiment may refer to relevant descriptions of other embodiments.

In several embodiments provided by the application, it is to be understood that the disclosed technical content may be implemented in other manners. The apparatus embodiments described above are merely illustrative. For example, the division of the unit or module is only a logical function division. In actual implementation, there may be another division manner, for example, multiple units or modules may be combined or integrated into another system, or some features may be ignored or not executed. In addition, the coupling or direct coupling or communication connection shown or discussed may be an indirect coupling or communication connection through some interfaces, modules or units, and may be electrical or otherwise.

The units or modules described as separate components may or may not be physically separated, and the members displayed as units or modules may or may not be physical units or modules, that is, may be located in one place, or may be distributed to multiple network units or modules. Some or all of the units or modules may be selected according to actual needs to achieve the purpose of the solution of the present embodiment.

In addition, each functional unit or module in each embodiment of the application may be integrated into a processing unit or module, each unit or module may also physically exist independently, and two or more than two units or modules may also be integrated into a unit or module. The integrated unit or module may be implemented in a hardware form and may also be implemented in the form of a software functional unit or module.

The integrated unit may be stored in a computer-readable storage medium if being implemented in the form of a software functional unit and sold or used as a standalone product. Based on such an understanding, the technical solution of the application, which is essential or contributes to the conventional art, may be embodied in the form of a software product. The computer software product is stored in a storage medium, including a number of instructions for causing a terminal device (which may be a personal computer, a server, or a network device, etc.) to perform all or part of the steps of the methods described in various embodiments of the application. The foregoing storage medium includes: a U disk, a Read-Only Memory (ROM), a Random Access Memory (RAM), a mobile hard disk, a magnetic disk, or an optical disk, and the like, which may store a program code.

The above is a preferred implementation of the application. It is to be noted that a number of modifications and refinements may be made by those of ordinary skill in the art without departing from the principles of the application, and such modifications and refinements are also considered to be within the scope of protection of the application.

What is claimed is:

1. A method to automatically select a working mode of a WIFI and Bluetooth dual-mode network device, the device having a WIFI module for WIFI connection and a Bluetooth module for Bluetooth connection, the method comprising:
   acquiring a network module status of the device, wherein the network module status indicates whether the WIFI module or the Bluetooth module of the device is turned on;
   obtaining, if the WIFI module and the Bluetooth module are turned on at the same time, a wireless data packet in a wireless network environment where the device is located to automatically determine whether the wireless network environment where the device is located is a WIFI network environment or a Bluetooth network environment; and
   automatically selecting a working mode of the drive according to the wireless network environment in which the device is located by turning on one of the WIFI module and the Bluetooth module and turning off the other one of the WIFI module and the Bluetooth module.

2. The method of claim 1, wherein if the wireless network environment where the device is located is a WIFI network environment, turning on the WIFI module and turning off the Bluetooth module; or
   if the wireless network environment where the device is located is a Bluetooth network environment, turning on the Bluetooth module and turning off the WIFI module.

3. The method of claim 1, wherein automatically determining whether the wireless network environment where the device is located is a WIFI network environment or a Bluetooth network environment comprises:
   acquiring the wireless data packet in a wireless network environment where the device is located;
   parsing the wireless data packet to acquire WIFI features and Bluetooth features of the wireless data packet; and
   selecting one of the WIFI features and the Bluetooth features as features indicated by the wireless data packet to automatically determine the type of a wireless network environment where the device is located.

4. The method of claim 1, wherein the WIFI module or the Bluetooth module of the device is turned on when the device is delivered or when the device is powered on.

5. A non-transitory storage medium of the device of claim 1, comprising a stored program, wherein when the program is run, the device is controlled to perform the method of claim 1.

6. A processor, configured to run a program, wherein the program is run to perform the method of claim 1.

7. A terminal, comprising: one or more processors, a memory, and one or more programs, wherein the one or more programs are stored in the memory, and configured to be executed by the one or more processors, and when executed, the one or more programs cause the one or more processors to perform the method of claim 1.

8. A computer program product, wherein the computer program product is tangibly stored on a computer-readable medium and includes computer-executable instructions that, when executed, cause at least one processor to perform the method of claim 1.

9. A device control apparatus of a WIFI and Bluetooth dual-mode network device for automatically selecting a working mode of the dual-mode network device, the device having a WIFI module for WIFI connection and a Bluetooth module for Bluetooth connection, the apparatus comprising:
   a status determination module, configured to acquire a network module status of the device, wherein the network module status indicates whether the WIFI module or the Bluetooth module of the device is turned on;

a feature detection module, configured to obtain, if the WIFI module and the Bluetooth module are turned on at the same time, a wireless data packet in a wireless network environment where the device is located to automatically determine whether the wireless network environment where the device is located is a WIFI network environment or a Bluetooth network environment; and a mode selection module, configured to automatically select a working mode of the drive according to the wireless network environment in which the device is located by turning on one of the WIFI module and the Bluetooth module and turning off the other one of the WIFI module and the Bluetooth module.

10. The apparatus of claim 9, wherein if the wireless network environment where the device is located is a WIFI network environment, the mode selection module turns on the WIFI module and turns off the Bluetooth module; or if the wireless network environment where the device is located is a Bluetooth network environment, the mode selection module turns on the Bluetooth module and turns off the WIFI module.

11. The apparatus of claim 9, wherein automatically determining whether the wireless network environment where the device is located is a WIFI network environment or a Bluetooth network environment comprises:

by means of the feature detection module, acquiring the wireless data packet in a wireless network environment where the device is located;

parsing the wireless data packet to acquire WIFI features and Bluetooth features of the wireless data packet; and selecting one of the WIFI features and the Bluetooth features as features indicated by the wireless data packet to automatically determine the type of a wireless network environment where the device is located.

12. The apparatus of claim 9, wherein the WIFI module or the Bluetooth module of the device is turned on when the device is delivered or when the device is powered on.

13. A WIFI and Bluetooth dual-mode network lighting device, comprising, a control apparatus for automatically selecting a working mode of the dual-mode network lighting device, a WIFI module for WIFI connection, and a Bluetooth module for Bluetooth connection, the control apparatus comprising:

a status determination module, configured to acquire a network module status of the device, wherein the network module status indicates whether the WIFI module or the Bluetooth module of the device is turned on;

a feature detection module, configured to obtain, if the WIFI module and the Bluetooth module are turned on at the same time, a wireless data packet in a wireless network environment where the device is located to automatically determine whether the wireless network environment where the device is located is a WIFI network environment or a Bluetooth network environment; and a mode selection module, configured to automatically select a working mode of the drive according to the wireless network environment in which the device is located by turning on one of the WIFI module and the Bluetooth module and turning off the other one of the WIFI module and the Bluetooth module.

14. The device of claim 13, wherein if the wireless network environment where the device is located is a WIFI network environment, the mode selection module turns on the WIFI module and turns off the Bluetooth module; or if the wireless network environment where the device is located is a Bluetooth network environment, the mode selection module turns on the Bluetooth module and turns off the WIFI module.

15. The device of claim 13, wherein automatically determining whether the wireless network environment where the device is located is a WIFI network environment or a Bluetooth network environment comprises:

by means of the feature detection module, acquiring the wireless data packet in a wireless network environment where the device is located;

parsing the wireless data packet to acquire WIFI features and Bluetooth features of the wireless data packet; and selecting one of the WIFI features and the Bluetooth features as features indicated by the wireless data packet to automatically determine the type of a wireless network environment where the device is located.

16. The device of claim 13, wherein the WIFI module or the Bluetooth module of the device is turned on when the device is delivered or when the device is powered on.

17. A method to control the device of claim 13, the method comprising:

using the status determination module to acquire a network module status of the device, wherein the network module status indicates whether the WIFI module or the Bluetooth module of the device is turned on;

using the feature detection module to obtain, if the WIFI module and the Bluetooth module are turned on at the same time, a wireless data packet in a wireless network environment where the device is located to automatically determine whether the wireless network environment where the device is located is a WIFI network environment or a Bluetooth network environment; and using the mode selection module to automatically select a working mode of the drive according to the wireless network environment in which the device is located by turning on one of the WIFI module and the Bluetooth module and turning off the other one of the WIFI module and the Bluetooth module.

18. A non-transitory storage medium of a WIFI and Bluetooth dual-mode network lighting device, the lighting device comprising, a control apparatus for automatically selecting a working mode of the dual-mode network lighting device, a WIFI module for WIFI connection, and a Bluetooth module for Bluetooth connection, the control apparatus comprising:

a status determination module, configured to acquire a network module status of the device, wherein the network module status indicates whether the WIFI module or the Bluetooth module of the device is turned on;

a feature detection module, configured to obtain, if the WIFI module and the Bluetooth module are turned on at the same time, a wireless data packet in a wireless network environment where the device is located to automatically determine whether the wireless network environment where the device is located is a WIFI network environment or a Bluetooth network environment; and a mode selection module, configured to automatically select a working mode of the drive according to the wireless network environment in which the device is located by turning on one of the WIFI module and the Bluetooth module and turning off the other one of the WIFI module and the Bluetooth module, wherein the non-transitory storage medium of the lighting device comprises a stored program, wherein when the program is run, the lightening device is controlled to perform the method of claim 17.

19. The lighting device of claim 13, further comprising a light emitting apparatus.

20. The lighting device of claim 19, wherein the light emitting apparatus is a LED light.

\* \* \* \* \*